United States Patent Office 3,386,123
Patented June 4, 1968

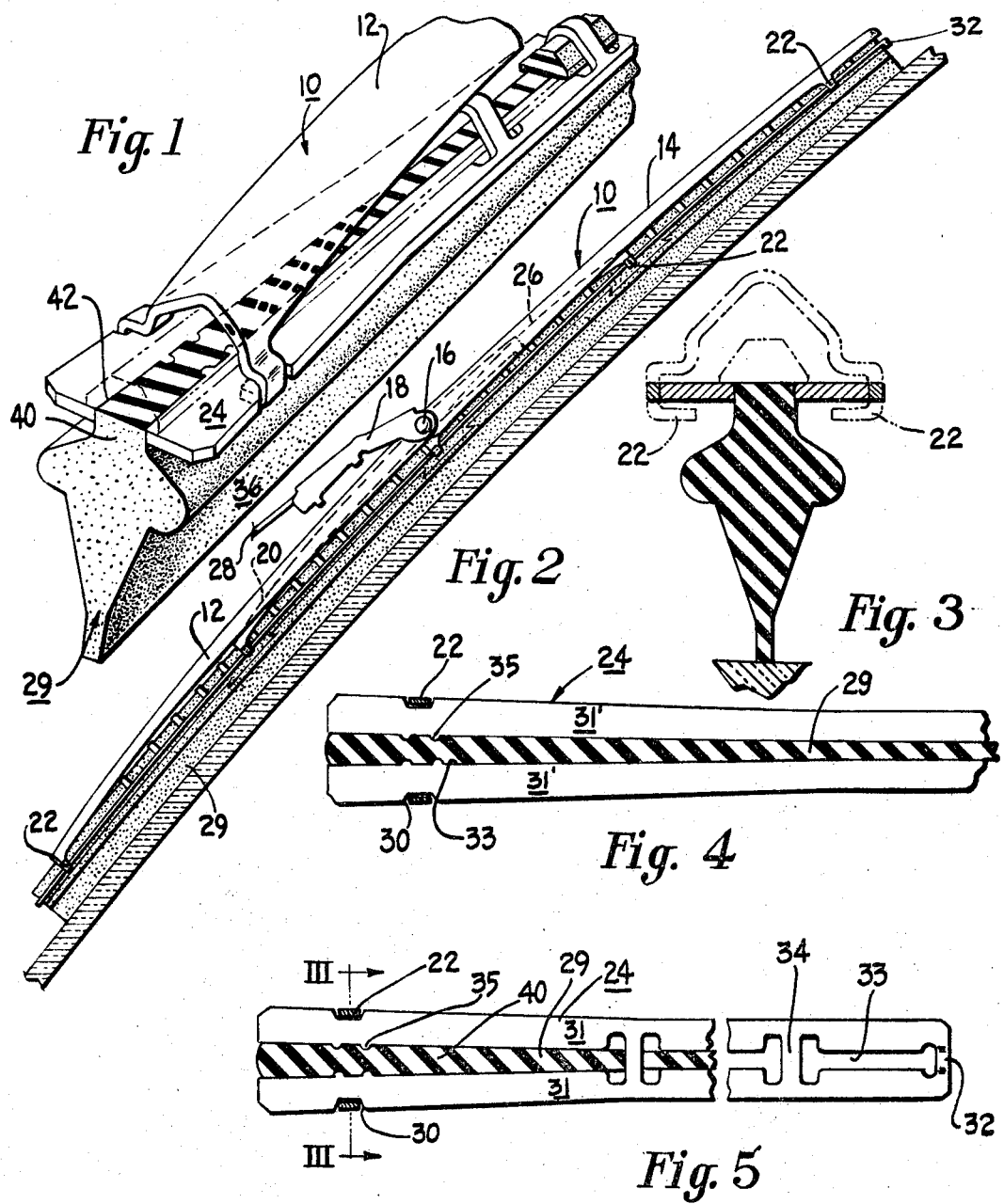

3,386,123
WINDSHIELD WIPER BLADE
John R. Oishei, Buffalo, and Raymond A. Deibel, Cheektowaga, N.Y., assignors to Trico Products Corporation, Buffalo, N.Y.
Filed Feb. 23, 1966, Ser. No. 529,294
9 Claims. (Cl. 15—250.42)

The present invention relates to an improved wiper for cleaning the windshield of an automobile and, more particularly, to an improved wiper of the type wherein the wiping element portion of the wiper is replaceable in the superstructure in which it is mounted.

The present refillable wiper blade assemblies utilize separate latching elements which contribute to the cost of labor and materials in the manufacture of wiper blades. Certain types, particularly those of the push button and spring variety, include a multiplicity of elements, negating the obvious economic advantages inherent in refillable elements, to renew the wiping quality without the necessity of replacing the entire wiper blade. Further, it is desirable to provide a refillable element wherein the operative structure is an integral part of the replaceable assembly. Such a construction provides quietness in operation.

The refill element of this invention includes an integral operating latch mechanism which is self-locking and can be inserted more readily in conventional wiper blade superstructures. The rubber-like or elastomeric wiping element is constructed so as to utilize its resiliency in providing the biasing force necessary to retain the refillable blade in assembled condition with the superstructure.

Another advantage of the construction of this invention is the provision of an open ended backing strip which facilitates assembly of the flexible backing strip with the rubber element during manufacture.

The principal object of the present invention is to provide a quiet, self-locking, self-contained blade rubber and backing strip refill element utilizing a minimum number of parts which is economical and simple to manufacture.

Other objects and advantages of the invention will be apparent from the following detailed description taken in connection with the accompanying drawings in which:

FIG. 1 is a partial perspective view, partly in section, of a wiper blade superstructure and refill element in its operative position;

FIG. 2 is a side elevational view of the wiper blade of this invention;

FIG. 3 is a sectional view taken on line III—III of FIG. 5 looking in the direction of the arrows with additional parts in phantom;

FIG. 4 is a top elevational view of one embodiment of the refill element of this invention; and FIG. 5 is a partial elevational view similar to FIG. 4 illustrating the embodiment of the invention of FIGS. 1 and 2.

Briefly, the invention comprises a conventional superstructure with an arm receiving clip mounted substantially centrally thereof and a replaceable rubber element incorporating a pressure distributing backing strip. The rubber element comprises a wiping lip, a body portion and a retaining head or back portion separated from the body portion by a relatively thin neck. The neck forms lateral longitudinal slots between the back and the body portion. In one form of the invention the backing strip includes a central slot open at one end which receives the neck portion of the rubber element. The central slot forms side rails secured together by transverse ribs which are struck up in arched configuration to receive the back portion of the rubber element. The neck portion adjacent one end tapers outwardly, forming a thickened neck portion which causes the side rails of the adjacent end of the backing strip to flex outwardly. The outwardly flexing portions of the backing strip include notches for engagement with claws on the superstructure to retain the refill element in operative position within the superstructure. In another form of the invention, the backing strip comprises a pair of side rails received in the lateral longitudinal slots between the back and the body portion which are held in position by the resiliency of the neck portion and the series of claws on the superstructure.

Protuberances on the opposing edges of the backing strip side rails retain the backing strip in assembled relation with the rubber element. The open end construction of the slot in the backing strip permits the rubber element to be inserted into the backing strip in a simple manner during manufacture.

The wiper blade (see FIG. 1) includes a superstructure 10 consisting of channel-shaped levers 12 and 14 which are pivotally connected at their adjacent ends by a rivet 16 which also pivotally supports an arm receiving clip 18 of any suitable or conventional type. A secondary lever 20 is pivotally supported intermediate its ends on the rivet 16. The outer ends of the levers 12 and 14 are formed into fingers or blade straddling claws 22 which slidably engage opposite edge portions of flexible backing strip 24. One end of secondary lever 20 is also formed into fingers or claws 22 which slidably engage opposite edges of the backing strip 24 intermediate the center and one end portion thereof. At its other end, secondary lever 20 is pivotally connected to a yoke-like lever 26. Yoke-like lever 26 has its opposite ends formed into fingers or claws 22 which slidably engage opposite edges of the backing strip at spaced points intermediate the ends of the backing strip. A spring (not shown) encircles rivet 16 and biases levers 12 and 14 in a clockwise and counterclockwise direction, respectively, when viewed from FIG. 2.

Thus, five sets of fingers or claws 22 are provided for slidably engaging opposite edge portions of flexible backing strip 24 for transmitting pressure from wiper arm 28 to the rubber blade or wiping element 29 carried by the backing strip 24. However, the fingers or claws 22 adjacent one end of the blade engage a notch 30 in the backing strip for anchoring the blade and backing strip assembly to the superstructure. It will, of course, be understood that any suitable type of superstructure incorporating various arrays of levers and yokes may be utilized.

The backing strip 24, shown in FIG. 5, is formed from a flat strip of flexible material and includes a longitudinal substantially central slot open at one end and extending to a point adjacent the other end of the strip, thus dividing the backing strip into a pair of side rails 31 having upwardly arched bridges or ribs 34. A downwardly arched bridge 32' is provided at the closed end. At the end adjacent the notch 30, the side rails are biased outwardly by a transversely thickened or tapered portion of the neck portion 40 of the rubber element or blade 29. A pair of projections or protuberances 35 extending inwardly toward the opposing side rail 31 are provided at the outwardly biased portion of the backing strip 24 which compress and firmly engage the neck portion 40 of the rubber element or blade 29 and retain the backing strip 24 and rubber element 29 in position relative to each other. It will, of course, be understood that any suitable or desirable number of projections, including one or more, may be utilized for this purpose although two on each side rail are illustrated.

A modified embodiment of the invention is illustrated in FIG. 4 where the side rails 31' are each separate elements and the ribs 34 are omitted. In all other respects the embodiments of FIG. 4 is identical to the embodiment in FIG. 5 and, for the purpose of brevity and clearness, will not be further described.

The rubber element or blade 29 includes a wiping lip 36 which extends downwardly from central portion or body portion 38. A reduced neck portion 40 is adapted to fit within slot 33 of the flexible backing strip 24 and an enlarged back portion 42 of the wiping element is located above slot 33. The bridges or ribs 34 overlie and straddle the back portion 42. The bridge 32 at the end of the backing strip 24 prevents longitudinal movement of the wiping element 29 relative to the backing strip 24.

The backing strip 24 is cut from flat material to form parallel edges on each side of the strip and the slot is formed therein. Utilization of the parallel edges permits the shearing of a large number of backing strips from strip stock utilizing a progressive die mechanism. The rubber wiping element 29 and the backing strip 24 are then assembled as a self-locking refillable wiping element unit. Wiping unit 29 can then be assembled with the superstructure 10 by sliding the rails through the claws 22 until the outwardly biased portion of the rail 31 engages the outermost claw of lever 12. The claw moving along the edge of the side rail cams the side rail inwardly until the notch or notches 30 engage the claw or claws, at which time the resilience of the rubber neck portion 40 retains the claw 22 and notch 30 in engagement. The protuberances 35 engage the rubber to retain the side rail 31 and rubber element 29 in position relative to each other.

The refill unit can easily be removed by compressing the side rails 31 together adjacent the notched end, thereby causing the notch 30 to disengage from the claw 22, permitting easy removal and replacement.

A unique blade utilizing a notch construction for a latching element has been provided which requires no additional elements and provides all the operative latching construction on the expendable refill element so that no essential parts necessary for retaining the refill unit are necessary on the blade superstructure.

It should now be apparent that an improved and effective refillable blade has been provided. Certain specific embodiments of the invention have been described for the purpose of illustration, but it will be apparent that various modifications and other embodiments are possible within the scope of the invention. It is to be understood therefore that the invention is not limited to the specific arrangement shown, but in its broadest espects it includes all equivalent embodiments and modifications which come within the scope of the invention.

What is claimed is:

1. A windshield wiper comprising in combination with an arm pressure distributing superstructure having blade straddling claws, a wiping assembly comprising a blade of rubber-like material having a longitudinally extending wiping lip and a longitudinally extending back portion forming a longitudinally extending neck portion therebetween, said neck portion having a transversely thickened portion adjacent an end thereof, a backing strip including a pair of spaced apart side rails being disposed on opposite sides of said neck portion, engaging means formed on at least one of said side rails disposed in the region of said thickened portion of said neck for operatively engaging said superstructure to securely retain said wiping assembly and said superstructure in assembled condition.

2. A windshield wiper according to claim 1 wherein said thickened portion of said neck diverges from a plane adjacent the end of said blade to the adjacent end thereof.

3. A windshield wiper according to claim 1 wherein said side rails include retaining means on the opposing edges inthe regions of said thickened portion of said neck for operative engagement with said thickened portion of said neck to prevent relative movement between said rubber-like blade and said side rails.

4. A windshield wiper according to claim 1 wherein said engaging means comprises a notch on the outer edge of the side rail.

5. A windshield wiper according to claim 4 wherein said notch is engageable with a blade straddling claw of said superstructure to securely retain said wiping assembly and said superstructure in assembled condition.

6. A windshield wiper comprising in combination with an arm pressure distributing superstructure having blade straddling claws, a wiping assembly comprising a blade of rubber-like material having a longitudinally extending wiping lip and a longitudinally extending back portion forming a longitudinally extending neck portion therebetween, said neck portion having a transversely thickened portion adjacent an end thereof, a backing strip having a central longitudinal slot forming a pair of side rails and being closed at one end and open at the other end, said slot receiving said neck portion, engaging means formed on at least one of said side rails disposed adjacent the open end of said slot, said thickened portion of said neck being located adpacent said engaging means, said engaging means being engageable with an element of said superstructure, said thickened portion biasing said engaging means into engagement with said element of said superstructure whereby said wiping assembly is securely retained in assembly with said superstructure.

7. A windshield wiper according to claim 6 wherein said engaging means comprises a notch on the outer edge of at least one of said said rails and said element of said superstructure comprises a claw thereof engageable with said notch.

8. A windshield wiper assembly according to claim 7 wherein protuberances are formed on the opposing inner edges of said side rails for engagement with said thickened portion of said neck portion.

9. A windshield wiper assembly according to claim 8 wherein transverse upset connecting ribs are provided at longitudinally spaced points connecting the side rails.

References Cited

UNITED STATES PATENTS

| Re. 24,974 | 4/1961 | Krohm | 15—250.42 |
| 2,687,544 | 8/1954 | Scinta | 15—250.42 |
| 3,018,500 | 1/1962 | Anderson | 15—250.42 |
| 3,076,993 | 2/1963 | Anderson | 15—250.42 |

CHARLES A. WILLMUTH, *Primary Examiner.*

R. I. SMITH, *Assistant Examiner.*